(12) United States Patent  (10) Patent No.: US 7,514,692 B2
Bouhnik et al.  (45) Date of Patent: Apr. 7, 2009

(54) METHOD AND APPARATUS FOR REDUCING POLARIZATION WITHIN AN IMAGING DEVICE

(75) Inventors: Jean-Paul Bouhnik, Zichron Yaakov (IL); Alexander Gabriel Fishler, Haifa (IL); Hernan Altman, Haifa (IL); Uzi Dror, Haifa (IL); Ira Blevis, Zichron Yaakov (IL)

(73) Assignee: GE Medical Systems Israel, Ltd., Tel Aviv (IL)

( * ) Notice: Subject to any disclaimer, the term of this patent is extended or adjusted under 35 U.S.C. 154(b) by 322 days.

(21) Appl. No.: 11/498,589

(22) Filed: Aug. 3, 2006

(65) Prior Publication Data

US 2007/0029496 A1  Feb. 8, 2007

Related U.S. Application Data

(63) Continuation-in-part of application No. 11/159,374, filed on Jun. 22, 2005, now Pat. No. 7,312,458.

(51) Int. Cl.
*G01T 1/24* (2006.01)

(52) U.S. Cl. .............................. 250/370.15; 250/370.13
(58) Field of Classification Search ............ 250/370.15, 250/370.13
See application file for complete search history.

(56) References Cited

U.S. PATENT DOCUMENTS

| 6,011,264 | A | * | 1/2000 | Lachish et al. | ......... 250/370.13 |
| 6,399,951 | B1 |  | 6/2002 | Paulus et al. |  |
| 6,404,547 | B1 | * | 6/2002 | Hull | .......................... 359/399 |
| 2006/0076500 | A1 | * | 4/2006 | Watanabe | .............. 250/370.15 |
| 2006/0289776 | A1 | * | 12/2006 | Gagnon et al. | ......... 250/370.13 |

* cited by examiner

*Primary Examiner*—David P Porta
*Assistant Examiner*—Mindy Vu
(74) *Attorney, Agent, or Firm*—The Small Patent Law Group; Dean D. Small (57) ABSTRACT

A method and apparatus for reducing polarization within an imaging device are provided and include a method of controlling an image detecting device. The method includes applying heat to the image detecting device having at least one ohmic contact and controlling the applied heat to adjust a temperature level of the image detecting device.

22 Claims, 6 Drawing Sheets

METHOD AND APPARATUS FOR REDUCING POLARIZATION WITHIN AN IMAGING DEVICE

This application is a continuation-in-part and claims priority to U.S. patent application Ser. No. 11/159,374 filed Jun. 22, 2005, now U.S. Pat. No. 7,312,458 for "METHOD AND APPARATUS FOR REDUCING POLARIZATION WITHIN AN IMAGING DEVICE," which is hereby incorporated by reference herein in its entirety.

BACKGROUND OF THE INVENTION

This invention relates generally to imaging systems, and more particularly, to controlling image detecting devices in the imaging systems.

Imaging devices, such as gamma cameras and computed tomography (CT) imaging systems, are used in the medical field to detect radioactive emission events, for example, gamma rays in the range of 140 keV emanating from a subject, such as a patient and to detect transmission x-rays not attenuated by the subject, respectively. An output, typically in the form of an image that graphically illustrates the distribution of the sources of the emissions within the object and/or the distribution of attenuation of the object is formed from these detections. An imaging device may have one or more detectors that detect the number of emissions, and may have one or more detectors to detect x-rays that have passed through the object. Each of the detected emission photons and transmitted x-ray photons may be referred to as a "count," but the detected and transmitted x-ray photons may also be counted together as a 'signal current'. The detector also determines the number of counts received at different spatial positions. The imager then uses the position dependent count tallies to determine the distribution of the gamma sources and x-ray attenuators, typically in the form of a graphical image having different colors or shadings that represent the processed count tallies or the image may be reconstructed from these counts.

A pixelated semiconductor detector, for example, fabricated from cadmium zinc telluride (CZT) or cadmium telluride (CdTe), may provide an economical method of detecting the gamma rays and x-rays. Specifically, at least one known imaging system includes a Room Temperature Semiconductor Radiation Detector (RTD) that is utilized to produce an image having a higher image quality. During operation, the RTD converts radiation photons to an electric charge (Q) using at least one of the photoelectric effect, the Compton effect, and/or electron-electron scattering. Converting photons directly to an electric charge facilitates eliminating the steps of light production and light detection and the corresponding inefficiencies that occur in the known scintillator technology. However, to operate at room temperature, RTD's must have sufficiently large Band Gap Energies (BG) to decrease the quantity of free charge carriers (N) in the material and allow the application of a higher bias voltage (Bias High Voltage HV). This allows the detection of signal pulses without producing a background electric current, referred to herein as a dark current ($I_d$). During operation, the dark current can saturate the readout electronics, and/or reduce the signal to noise ratio (SNR) when measuring the signal electric charge (Q). To measure the signal electric charge (Q), detection electrodes and electronics are applied to surfaces of the RTD. Provided the charge mobility ($\mu$) and carrier recombination lifetime ($\tau$) are high enough, the bias high voltage causes the detection of the electric charge (Q) on the electrodes and electronics.

However, known detectors that are fabricated using a CZT or CdTe material may have a dark current ($I_d$) that is not sufficiently controlled by the larger band gap. Accordingly, at least some known imaging systems include a cooling system to facilitate reducing the free charge carriers (N) and/or reducing the dark current ($I_d$). For example, at least one known imaging system includes a cooling system that utilizes liquid nitrogen to facilitate reducing the free charge carriers (N) and/or reducing the dark current ($I_d$). However, using a liquid nitrogen system is generally impractical for use in a commercial imaging system. Another known system uses chilled water to control CZT and electronics temperatures, but this is also a significant cost in terms of engineering and safety. Moreover, at least one known imaging system utilizes a Peltier element to facilitate reducing the free charge carriers (N) and/or reducing the dark current ($I_d$) that facilitates avoiding the adverse increase of the dark current ($I_d$) that may be generated due to the heat of nearby objects, for example, electronics.

Accordingly, while known cooling systems may have a positive effect on reducing the dark current ($I_d$), the cooling systems may have an adverse effect on the charge mobility ($\mu$) and carrier recombination lifetime ($\tau$). For example, when the quantity of impurities and band edge states within the intrinsic semiconductor device (e.g., reduced grade detectors and/or doped semiconductor devices) increases, cooling may decrease the charge mobility ($\mu$) and carrier recombination lifetime ($\tau$) by increasing the interaction of the electric charge (Q) with these localized states, referred to as shallow and deep traps. More specifically, when the semiconductor device is fabricated using a Cadmium Zinc Telluride (CZT) materiel, where the charge mobility ($\mu$) and carrier recombination lifetime ($\tau$) product is marginal, such traps may be a limiting factor.

BRIEF DESCRIPTION OF THE INVENTION

In one embodiment, a method of controlling an image detecting device is provided. The method includes applying heat to the image detecting device having at least one ohmic contact and controlling the applied heat to adjust a temperature level of the image detecting device.

In another embodiment, an image detecting device is provided that includes a substrate, at least one ohmic contact coupled to the substrate, and a heat source configured to increase a temperature of the substrate.

In yet another embodiment, an imaging system is provided that includes a radiation source configured to emit a flux of photons and an image detecting device configured to receive the flux of photons and generate a response based on the flux of photons. The image detecting device is fabricated at least in part using a cadmium at least one of zinc telluride (CZT) material and a cadmium telluride (CdTe) material with at least one ohmic contact coupled to the image detecting device. The imaging system further includes a heat source configured to increase a temperature of the image detecting device.

DETAILED DESCRIPTION OF THE INVENTION

Figure 1:
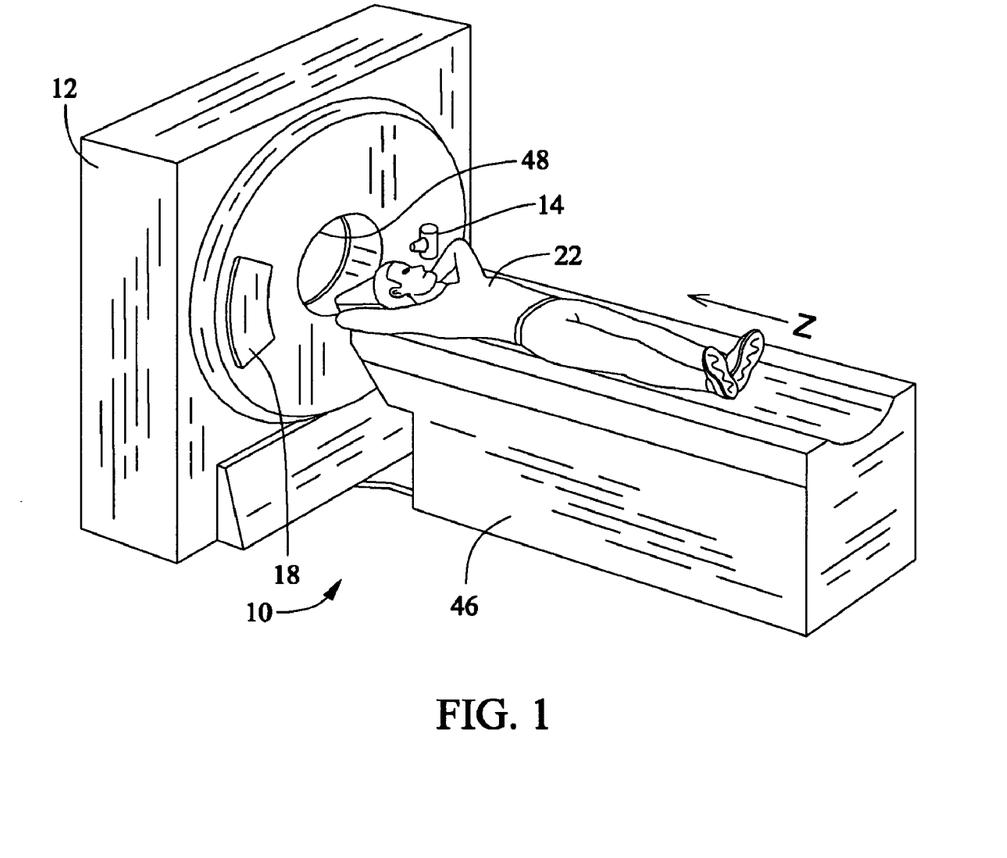
FIG. 1 is a perspective view of an imaging system constructed in accordance with an embodiment of the invention.
Figure 2:
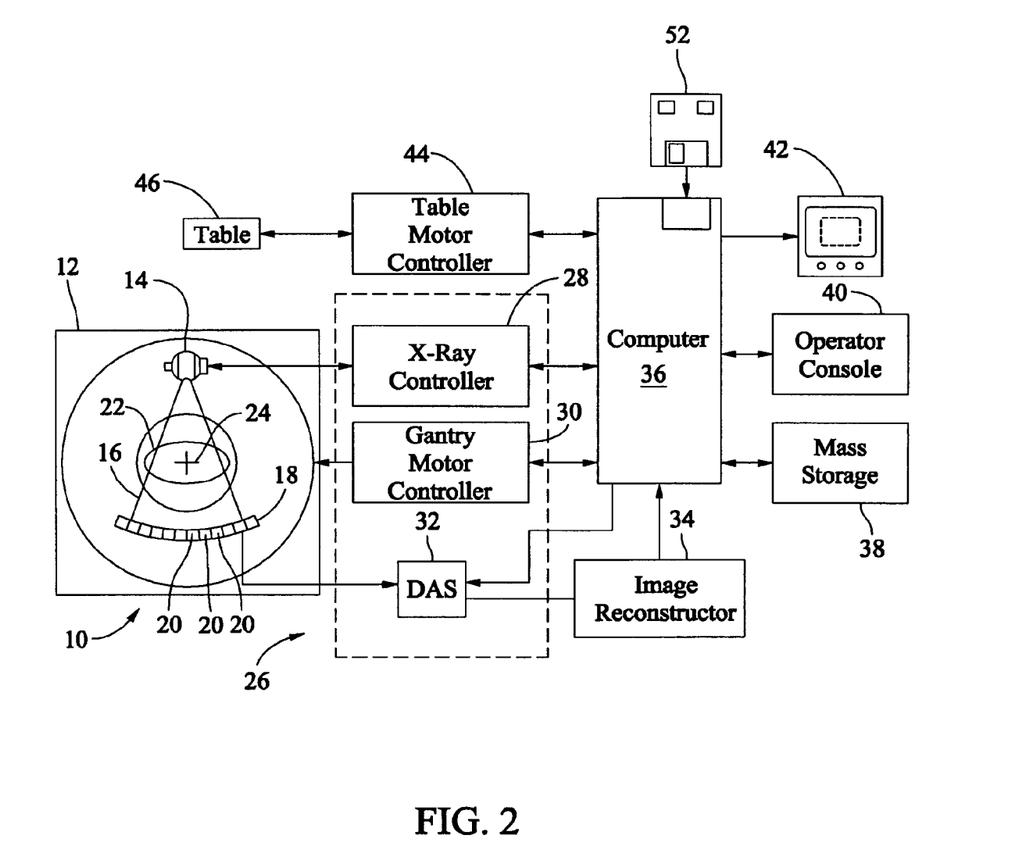
FIG. 2 is a block schematic diagram of the system illustrated in FIG. 1.

FIGS. 1 and 2 illustrate an exemplary imaging system, for example, a Computed Tomography (CT) imaging system. The system 10 is shown as including a gantry 12 representative of a "third generation" CT imaging system. The gantry 12 has an x-ray tube 14 (also called an x-ray source 14 herein) that projects a beam of x-rays 16 toward a detector array 18 on the opposite side of the gantry 12. The detector array 18 is formed by a plurality of detector rows (not shown) including a plurality of detector elements 20 which together sense the projected x-rays that pass through an object, such as a medical patient 22 between the array 18 and the source 14. Each detector element 20 produces an electrical signal that represents the intensity of an impinging x-ray beam and hence can be used to estimate the attenuation of the beam as it passes through the object or the patient 22. During a scan to acquire x-ray projection data, the gantry 12 and the components mounted therein rotate about a center of rotation 24. FIG. 2 shows only a single row of detector elements 20 (i.e., a detector row). However, a multi-slice detector array 18 may include a plurality of parallel detector rows of detector elements 20 such that projection data corresponding to a plurality of quasi-parallel or parallel slices can be acquired simultaneously during a scan. Further, and as described in more detail herein, a heat source 220 is provided in connection with the detector array 18.

Rotation of components on the gantry 12 and the operation of the x-ray source 14 are governed by a control mechanism 26 of the system 10. The control mechanism 26 includes an x-ray controller 28 that provides power and timing signals to the x-ray source 14 and a gantry motor controller 30 that controls the rotational speed and position of components on the gantry 12. A data acquisition system (DAS) 32 in the control mechanism 26 samples analog data from the detector elements 20 and converts the data to digital signals for subsequent processing. An image reconstructor 34 receives sampled and digitized x-ray data from the DAS 32 and performs high-speed image reconstruction. The reconstructed image is applied as an input to a computer 36, which stores the image in a storage device 38. The image reconstructor 34 can be specialized hardware or computer programs executing on the computer 36.

The computer 36 also receives commands and scanning parameters from an operator via a console 40 that has a keyboard. An associated display 42, for example, a cathode ray tube or other suitable display device, allows the operator to observe the reconstructed image and other data from the computer 36. The operator supplied commands and parameters are used by the computer 36 to provide control signals and information to the DAS 32, the x-ray controller 28, and the gantry motor controller 30. In addition, the computer 36 operates a table motor controller 44, which controls a motorized table 46 to position the patient 22 in the gantry 12. Particularly, the table 46 moves portions of the patient 22 through the gantry opening 48.

In one embodiment, the computer 36 includes an instruction reading or receiving device 50, for example, a floppy disk drive, CD-ROM drive, DVD drive, magnetic optical disk (MOD) device, or any other digital device including a network connecting device such as an Ethernet device for reading instructions and/or data from a computer-readable medium 52, such as a floppy disk, a CD-ROM, a DVD or another digital source such as a network or the Internet, as well as yet to be developed digital means. In another embodiment, the computer 36 executes instructions stored in firmware (not shown). The computer 36 is programmed to perform functions described herein, and as used herein, the term computer is not limited to just those integrated circuits referred to in the art as computers, but broadly refers to computers, processors, microcontrollers, microcomputers, programmable logic controllers, application specific integrated circuits, and other programmable circuits, and these terms are used interchangeably herein.

Although the specific embodiment mentioned above refers to a third generation CT system, the methods described herein equally apply to fourth generation CT systems (stationary detector—rotating x-ray source) and fifth generation CT systems (stationary detector and x-ray source). However, the embodiments also may be used in connection with lower end or earlier generation CT systems, such as CT systems with single or dual row CT detectors. Additionally, although the herein described methods and apparatus are described in a computed tomographic imaging system, it is contemplated that the benefits of the invention accrue to other medical and non-medical imaging systems such as a gamma camera, and/or systems typically employed in an industrial setting or a transportation setting for Non-Destructive Testing, such as, for example, but not limited to, a baggage scanning system for an airport or other transportation center.

Figure 3:
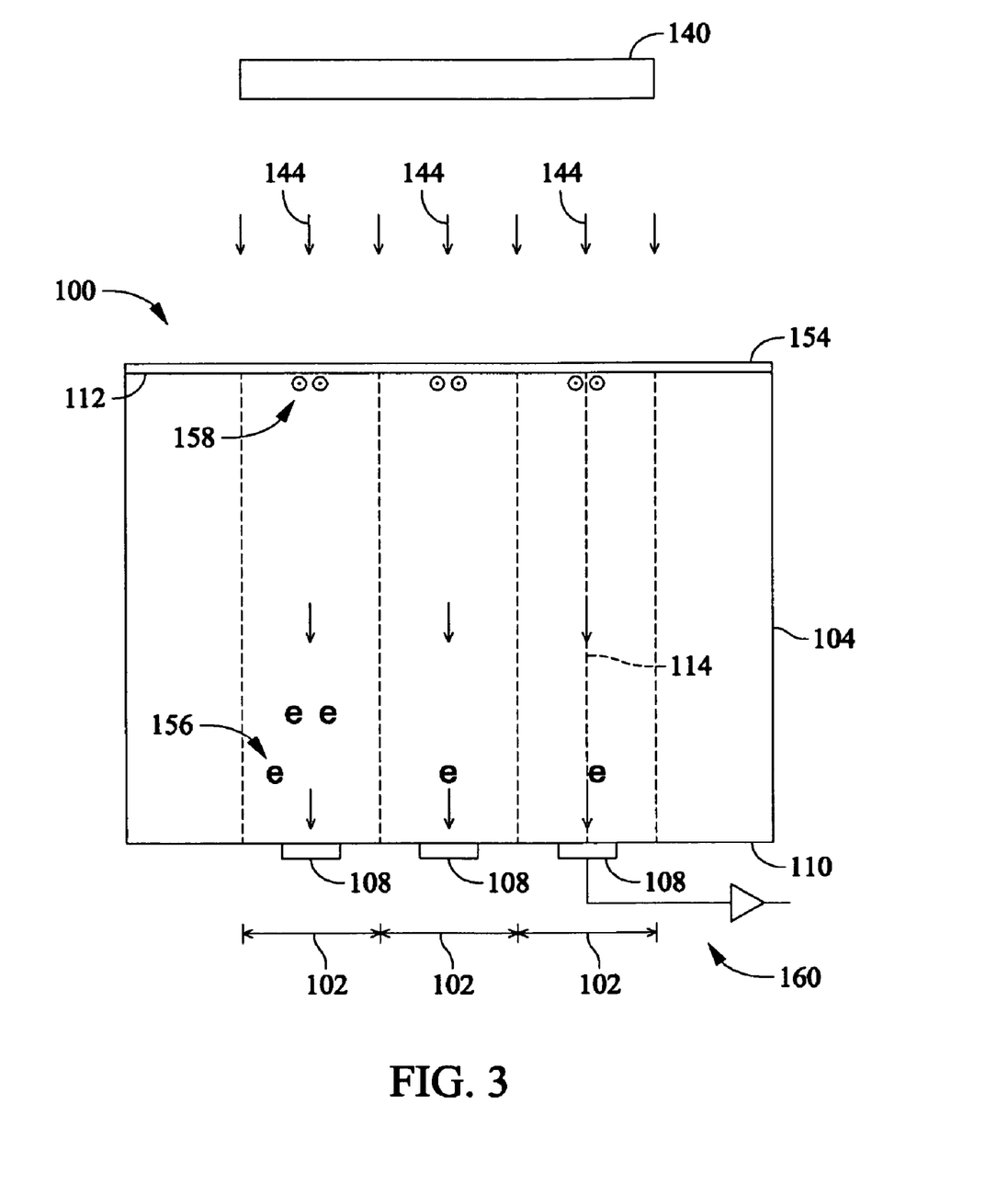
FIG. 3 is a cross-sectional view of an exemplary radiation detector having a plurality of pixelated semiconductor detector elements constructed in accordance with an embodiment of the invention.

FIG. 3 is a cross-sectional elevation view of an exemplary imaging device detector or image detecting device 100, that can be used with the imaging system 10 (shown in FIGS. 1 and 2), constructed in accordance with one embodiment of the present invention and includes a plurality of pixelated semiconductor detector elements 102 that may be used in connection with, for example, localizing a radiation interaction event in the detector and a detector substrate 104. The detector 100 may be formed of a radiation responsive semiconductor material, for example, cadmium zinc telluride (CZT) crystals or cadmium telluride (CdTe) crystals. However, other materials may be used, for example, mercuric iodide ($HgI_2$) and/or lead iodide ($PbI_2$) The detector elements 102 may be formed on the substrate 104 by pixelating a corresponding plurality of pixel electrodes 108, also referred to herein as anodes, coupled to a first surface 110 of the detector substrate 104 (shown as a lower surface). A cross-sectional size and shape of the pixel electrodes 108 and a spacing between each of the pixel electrodes 108 facilitates determining a location and size of each pixelated detector element 102. Specifically, each pixelated detector element 102 is located proximate a second surface 112 (shown as an upper surface) of the detector substrate 104 in substantial alignment with a longitudinal axis 114 of a corresponding pixel electrode 108. An intrinsic spatial resolution of the detector 100 may be defined by the size of and the spacing between each pixelated detector element 102.

Moreover, in the exemplary embodiment, the second surface 112 may be substantially covered by a single cathode electrode 154. The first surface 110 has a rectangular (or hexagonal or otherwise) array of small, for example, between about one millimeter squared (mm²) and about ten mm², generally square pixel electrodes 108 configured as anodes. A voltage difference applied between the pixel electrodes 108 and the cathode 154 during operation generates an electric field (detector field) in the substrate 104. The detector field may be, for example, about one kilovolt per centimeter to about three kilovolts per centimeter. Although the pixel electrodes 108 are described in the exemplary embodiment as being generally square, this shape should not be understood to be limiting, in that other shapes of pixel electrodes 108 are contemplated, for example, round, or area filling shapes. It should be noted that in some semiconductors, the direction of the current flow (e.g., high voltage current flow) may be reversed, for example wherein a common anode and a plurality of cathodes are provided. The direction generally depends on the relative mobility of the free charges and the average free mean traveling distance for the free charges. The pixelated electrode is generally provided at the destination of the carriers having the longer average traveling distance.

In operation, a flux of photons 144, for example, emission gammas and transmission x-rays 144, from a source 140 are directed towards the second surface 112. It should be noted that the flux may be collimated (e.g., at least one-dimensional collimation applied to reduce scattered photons from reaching the detector) or uncollimated. When a photon is incident on the substrate 104, the photon generally loses all its energy in the substrate 104 by absorption and subsequent ionization and leaves pairs of mobile electrons 156 and holes 158 in a small localized region of the substrate 104. As a result of the detector field, the holes 158 drift toward the cathode 154 and the electrons 156 drift toward the pixel electrodes 108, thereby inducing charges on the pixel electrodes 108 and the cathode 154. The induced charges on the pixel electrodes 108 are detected and identify at least one of: the time at which a photon was detected, how much energy the detected photon deposited in the substrate 104 and where in the substrate 104 the photon interaction occurred, which information may be provided using, for example, readout electronics 160. Moreover, the induced charge on the cathode 154 can also be utilized by the readout electronics 160 to determine timing and energy information. It should be noted, however, that the timing information may not be registered, for example, in current mode, energy is not registered.

In an alternative embodiment, the imaging device includes a collimator (not shown) that includes a plurality of apertures defined through the collimator. During operation, photons, for example, emission gammas and transmission x-rays from the source 140 are directed towards and/or through the collimator. The photons are collimated utilizing the collimator, such that a collimated flux of photons is directed towards the surface 112.

Figure 4:
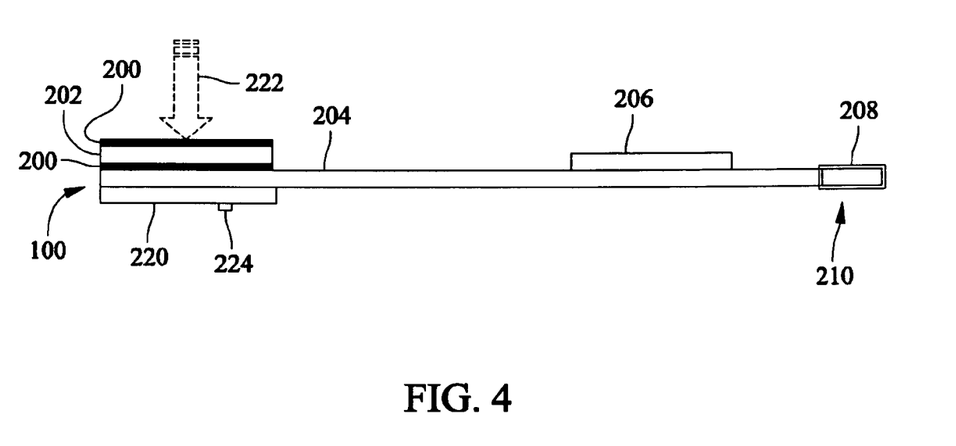
FIG. 4 is a cross-sectional view of a radiation detector constructed in accordance with an embodiment of the invention including a heat source.

Various embodiments of the invention provide a heat source for heating the detector 100 to control the temperature of the detector 100. FIG. 4 is a cross-sectional view of the exemplary detector 100 that includes at least one, and as shown, a pair of ohmic contacts 200 provided on a crystal 202, for example, a CZT crystal forming detection elements of the detector 100. The structure and configuration of the ohmic contacts 200 and the crystal 202 may be provided in any known manner. As used herein, ohmic contacts refer generally to any junction between a metal and a semiconductor that does not limit the current flow. The current is essentially limited by the resistance of the semiconductor outside the contact region rather than the thermal emission rate of carriers across a potential barrier at the contact. It should be noted that when reference is made to an ohmic contact this does not generally refer to a linear I-V characteristic for the ohmic contact, but merely that the contact does not limit the current flow. It further should be noted that the ohmic contacts 200 may be formed of any material, for example, gold or aluminum, and provided (e.g., applied) on one or more surfaces of the crystal 202, such as, configured as a film or layer thereon.

The detector 100 is generally formed as part, for example, a printed circuit board 204 that includes electronic components 206, which may be configured as readout electronics 160 (shown in FIG. 3) as described in more detail herein. A connector 208 also is provided on the printed circuit board 204, for example, at an end 210 and configured to connect the printed circuit board 204 to a portion of the imaging system 10 (shown in FIG. 1), such as, to a control portion of the imaging system 10.

In the exemplary embodiment, the detector 100 also includes an external heat source 220 that is configured to control an operational temperature of the detector 100, for example, increase the temperature of the CZT material of the detector 100. The heat source 220 may include any type of heating element, for example, a thermo-foil that heats based on the resistivity of the foil. However, various other embodiments may include, for example, a hot air source and fan to circulate the heat as described in more detail below. It is further contemplated that other heat sources may be provided to distribute heat to the plurality of detectors (or detector elements) including different types of heat conductors, for example, a bar of copper or aluminum (or a heat pipe) attached to a resistive heater. Alternatively, if the detector array is thermally isolated, heat generated by the electronics (e.g., the DAS 32 shown in FIG. 2 or the electronic components 206 shown in FIG. 4) may heat the detector array or elements. It should be noted that controlling the temperature may be provided by controlled removal of heat (or limited and controlled cooling).

Additionally, the heat source 220 is configured to have a thickness or absorption level so as to not absorb x-rays 222 impinging on the detector 100. Other configurations also may be provided so as to not absorb x-rays 222 including, for example, heating by heat conduction using air or forced circulation of air with the source provided on the other or opposite side of the detector (e.g., on the opposite side from the direction from which photons arrive). In an alternate embodiment, the heating element is integrated with at least one of the ohmic contacts 200. During normal operation, a temperature within the detector 100 will either increase and/or decrease based on the power supplied to electronics, for example, the electronic components 206, attached to the detector 100 and/or a temperature of the outside environment in which the detector 100 is operated. For example, the ambient air temperature within an examination room may either increase and/or decrease, thus either increasing and/or decreasing the operational temperature of the detector 100. Therefore, as used herein, the term operating temperature of the detector 100 is used to define the temperature of the detector 100 operated under typical conditions within a known detector operating environment.

Accordingly, and in the exemplary embodiment, the detector 100 includes the external heat source 220 that is configured to increase an operating temperature of the detector 100, for example, to a temperature that is greater than the typical operating temperature. For example, and in the exemplary embodiment, the heat source 220 includes a heating device that is positioned on (e.g., on top of or at a surface) of one or more elements of the ohmic contacts 200. In an alternate embodiment, the heat source 220 is positioned on the printed circuit board 204. In this alternate embodiment, the heating element or heating device still may be provided on the surface of one of more elements of the ohmic contacts. Alternatively, heat may be transferred through the printed circuit board 204 using vias (not shown). The heating portion of the heating source 220 may include the heating device with a first electrically insulating layer (not shown), a second electrically insulating layer (not shown), and an electrical heating element (not shown) that is positioned between first and second layers, respectively. The first and second layers may be fabricated from a material that is optimally configured to transmit heat generated by the heating element to the detector 100, thus increasing an operational temperature of the detector 100. In the exemplary embodiment, the first and second layers are fabricated, for example, from a relatively thin plastic polymer material.

During operation, the heat source 220 is activated such that a temperature of the heat source 220 is increased. Increasing a temperature of the heat source 220 facilitates heating an external surface of the detector 100. In the exemplary embodiment, and for example, a voltage may be applied by the heat source 220 to the heating element (e.g., a copper thermo-foil) to facilitate activating the heating element. Specifically, as the voltage applied to the heating element is increased, an operating temperature of the detector 100 is also increased. Thus, the voltage may be varied and controlled automatically to facilitate operating detector 100 at a desired temperature.

In another exemplary embodiment, the heat source 220 includes a heating device that is positioned adjacent the detector 100. In this exemplary embodiment, the heating device includes an electric fan assembly (not shown), and a heat generating device (not shown). In one embodiment, the heat generating device is a radiator, for example, that has a relatively warm heating fluid flowing therethrough. In another embodiment, the heat generating device is an electrical heating element that includes a plurality of openings extending therethrough.

During operation, the fan assembly is activated such that at least a portion of the air flow generated by the fan assembly is channeled through the heat generating device to facilitate increasing a temperature of the airflow. The heated air is then directed to an exterior surface of the detector 100, thus heating an external surface of the detector 100. In the exemplary embodiment, a temperature within the detector 100 is maintained between approximately 10° C. and approximately 100° C. depending on other factors, for example, preferred operating temperatures for the imaging system 10 (shown in FIG. 1).

Various embodiments also may include a temperature sensor 224 connected to the heat source 220. The temperature sensor 224 senses (e.g., measures) the temperature of the detector 100, for example, the surface of the detector 100 being heated by the heat source 220. The temperature sensor 224 also may sense the temperature of the heat source 220. The temperature sensor 224 is configured to provide temperature information to allow control of the temperature of the detector 100. For example, based on the temperature sensed by the temperature sensor 224, the temperature level of the heat source 220 may be adjusted (e.g., increased or decreased), such that an optimal temperature, desired temperature, a temperature within a predetermined range, etc. is maintained. The temperature sensor 224 may sense temperature at predetermined time intervals, periodically, randomly, upon receiving a user input, etc. Accordingly, the heat source 220 and temperature sensor 224 provide control of the temperature of the detector 100. It should be noted that one or a plurality of thermal sensors may be used for controlling the temperature. Thus, in the various embodiments there is not a one sensor per detector or detector element. For example, one thermocouple or thermistor is provided in an enclosure or housing for the detectors and is used with a thermostat controlled heater. Alternatively, one sensor may be provided per detector or detector element.

Figure 5:
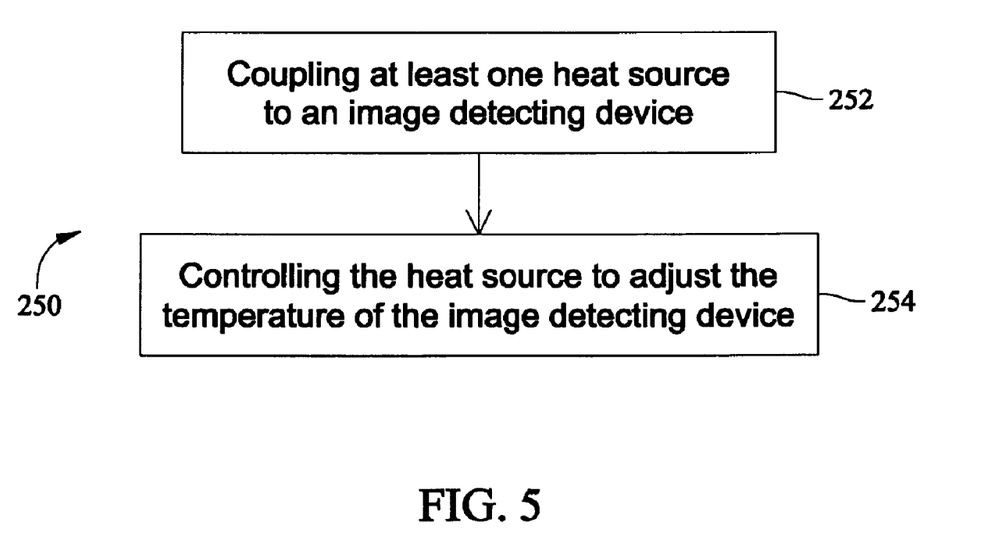
FIG. 5 is a flowchart illustrating an exemplary method of reducing polarization within a detector using the heat source shown in FIG. 4.

FIG. 5 is a flow chart illustrating an exemplary method 250 to control operation of a detector, and more particularly, to facilitate reducing polarization within the detector 100. This may be provided by adjusting the temperature of the detector 100 using, for example, the heat source 220 and the temperature sensor 224. It should be noted that as used herein, polarization is defined as a buildup of electric charge that occurs within the detector 100. Accordingly, the method 250 facilitates reducing and/or eliminating the conditions that cause polarization (e.g., charge trapping).

In the exemplary embodiment, the method 250 includes coupling at least one heat source, which may include, for example, a heating device and optionally a temperature sensor, to an image detecting device at 252. In particular, the heat source provides heat to at least one ohmic contact of the image detecting device. The heat source may be in direct contact with the surface of the ohmic contact or may be located a distance from the ohmic contact with heat transferred (e.g., blown by air) to the ohmic contact. In general, the heat source is in thermal contact with the image detecting device.

Thereafter, at 254, the heat source is controlled to adjust (e.g., increase or decrease) the temperature applied to the image detecting device, which changes the temperature of the image detecting device. A control system with feedback from a temperature sensor may be used to maintain the temperature of the image detecting device at, for example, a predetermined temperature or within a predetermined temperature range. This control may be provided using, for example, a photoconductive gain controlled by a DC current, with the heat source responding to a change in the DC current by either providing more or less heat (e.g., based on the resistivity of the hearting portion of the heat source). Accordingly, the voltage level and/or current may be varied or switched on and off to maintain the temperature level of the image detecting device. It should be noted that the temperature of the image detecting device is maintained even when power to the imaging system including the image detecting device is turned off or in a standby mode. Thus, when power to the imaging system or scanning portion is turned off, for example, between scans, power to the heat source is not turned off and controlled as described herein to maintain the temperature of the image detecting device.

Figure 6:
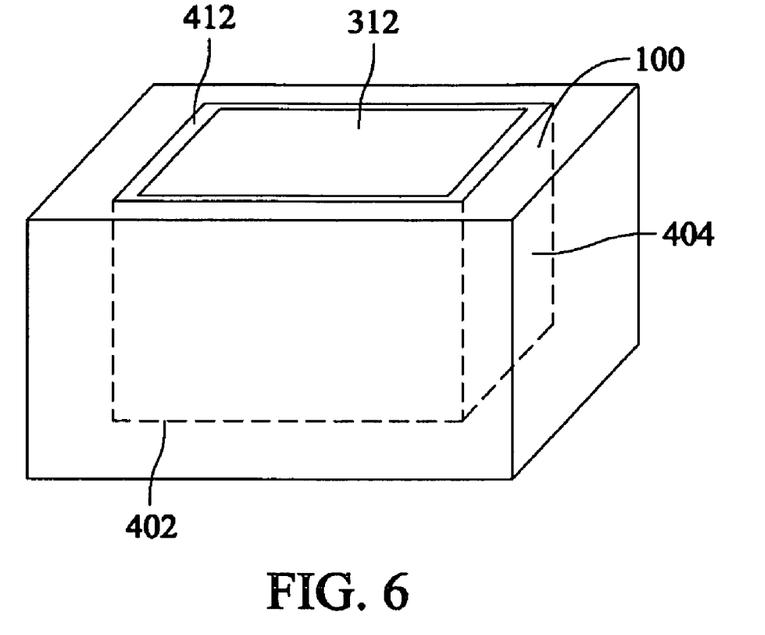
FIG. 6 is a perspective view of the radiation detector shown in FIG. 3 including an insulation covering constructed in accordance with an embodiment of the invention.
Figure 7:
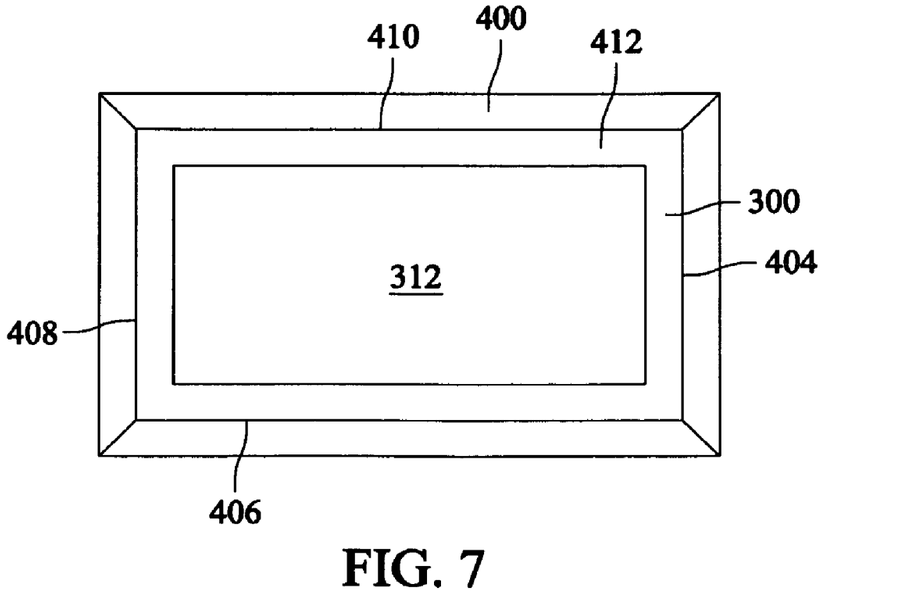
FIG. 7 is a top view of the radiation detector shown in FIG. 6.

FIG. 6 is a perspective view of the detector 100 that includes an insulating layer 400 that at least partially surrounds the detector device 100. FIG. 7 is a top view of the detector 100 shown in FIG. 6. More specifically, the detector 100 includes a bottom surface 402, a first side 404, a second side 406, a third side 408 that is opposite the first side 404, and a fourth side 410 that is opposite the second side 406. The detector 100 also includes an upper surface 412. In the exemplary embodiment, the detector upper surface 412 is at least partially covered by at least one of the ohmic contacts 200 (shown in FIG. 4) and as described previously herein. In the exemplary embodiment, a heating device 312 of the heat source 220 (shown in FIG. 4) is positioned on top of at least one of the ohmic contacts 200 to, for example, facilitate increasing a temperature within the detector 100.

Moreover, in the exemplary embodiment, the detector 100 also includes an insulating layer 400 to facilitate retaining heat that is generated utilizing the heating device 312 with the detector 100. More specifically, at least one of the bottom surface 402, the first side 404, the second side 406, the third side 408, and the fourth side 410 may be, or may not be, at least partially covered with the insulation layer 400 to facilitate retaining heat within the detector 100. In the exemplary embodiment, the bottom surface 402, the first side 404, the second side 406, the third side 408, and/or the fourth side 410 are each substantially covered with the insulation layer 400 to facilitate retaining heat within the detector 100. In another embodiment, the bottom surface 402, the first side 404, the second side 406, the third side 408, the fourth side 410, and the heating device 312 including the upper surface of detector 100, are covered with the insulation layer 400 to facilitate retaining heat within the detector 100. For example, the detector 100 and/or multiple detector assemblies are completely encased together or separately within the insulation layer 400. In the exemplary embodiment, if the insulating layer 400 is utilized to at least partially cover the surface of the incident radiation, for example, the cathode side of the detector 100, then the insulating layer 400 is fabricated from a material that is substantially transparent to the radiation, for example, the insulating layer is between approximately 2 millimeters and approximately 5 millimeters in thickness, and fabricated, for example, from a foam rubber.

In one embodiment, the insulation layer 400 is a foam insulation that is selectively sized to at least partially encapsulate the detector 100. In another embodiment, the insulation layer 400 is an insulating blanket formed using a fibrous insulation, for example, that is wrapped around at least a portion of the exterior surfaces of the detector 100.

Utilizing the insulation layer 400 as described herein facilitates maintaining the increased operational temperature within the detector 100. For example, during operation the heating device 312 is utilized to increase the operating temperature of the detector 100 to a predetermined operational temperature. When a temperature of the detector has reached the predetermined temperature, the insulation layer 400 facilitates maintaining the detector at the predetermined temperature, thus the power consumed by the heating device 100 is reduced, because the heating device 312 is not utilized to compensate for heat losses to the surrounding environment. Accordingly, the insulating layer 400 facilitates reducing detector heat loss, and thus reduces the total power consumed by the detector 100 including the heating device 312. The insulation also makes the temperature easier to control by sensors and control circuits.

The above-described imaging device detectors provide a cost-effective and reliable means for reducing polarization within an imaging detector. More specifically, the imaging detector includes at least one ohmic contact and a heat source that work together to reduce currents and polarization within the detector 100.

The detector components illustrated are not limited to the specific embodiment described herein, but rather, components of the detector may be utilized independently and separately, or repetitively from other components described herein. For example, the detector components described above may also be used in combination with different imaging systems. A technical effect of the embodiment of the systems and methods described herein includes improving the detector performance, for example, high flux, dark current, and spectral improvement, within a detector fabricated using a CZT material, by coupling at least one ohmic contact to the detector, and heating the detector to a temperature that is greater than a typical operating temperature.

Moreover, the combination of heating the detector and utilizing an ohmic contact can provide lowered dark current and higher charge mobility and lifetime. This in turn may allow improvements of the energy spectrum and high rate operation for the applications of NM and CT. Additionally, the combination of heating the detector and utilizing an ohmic contact facilitates preventing high flux desensitization, signal dependent instabilities, and energy response degradation, while increasing the useful flux limit. Moreover, reducing the dark currents allows the detector to be directly coupled to the readout electronics. Direct coupled electronics are simpler to build and allow reduced input capacitance. Reduced input capacitance allows reduced noise and increased signal. Low dark current prevents signal dependent heating in the semiconductor that is a source of gain and count rate instability. Signal dependent instabilities are very important and cannot be calibrated away and thus may prevent the use of semiconductor detectors in certain applications of medical imaging. Thus, improving detector response at high and low fluxes utilizing the methods and apparatus described herein facilitates utilizing lower and/or relatively less expensive grades of CZT material to fabricate the detector.

Accordingly, the detector described herein can achieve photon counting in transmission medical imaging, thereby providing the signal noise (sometime called Swank noise) reduction anticipated by photon counting techniques. This noise reduction can result in improved image quality or reduced patient dose. Photon counting in transmission medical imaging can also reduce the noise derived from dark current in current mode detectors that affects the parts of the image derived from the smallest detector signal amplitudes. Moreover, the single response, for example, reduced spectral tail, semiconductor radiation detector described herein can be utilized in a nuclear medicine application such a simultaneous dual isotope imaging where the energies of the two sources are too close to be resolved by the known detectors. The successful operation of CZT for the NM application with a reduced tail spectral component also allows the sensitivity/resolution tradeoff to be further optimized. Improved energy resolution in transmission imaging can allow energy resolution and therefore materials determination in, for example, a calcium scoring application.

While the invention has been described in terms of various specific embodiments, those skilled in the art will recognize that the various embodiments of the invention can be practiced with modification within the spirit and scope of the claims.

What is claimed is:

1. A method of controlling an image detecting device, said method comprising:
  applying heat to the image detecting device having at least one ohmic contact, wherein applying heat to the image detecting device comprises heating the at least one ohmic contact; and
  controlling the applied heat to adjust a temperature level of the image detecting device.

2. A method in accordance with claim 1 wherein applying heat comprises directly heating the image detecting device.

3. A method in accordance with claim 1 wherein applying heat comprises indirectly heating the image detecting device.

4. A method in accordance with claim 1 further comprising positioning a heating device to heat the at least one ohmic contact.

5. A method in accordance with claim 4 further comprising energizing the heating device to generate heat.

6. A method in accordance with claim 5 wherein the energizing is performed periodically to control the temperature level.

7. A method in accordance with claim 5 wherein the level of energizing is varied to control the temperature level.

8. A method in accordance with claim 5 wherein the energizing is performed when the image detecting device is switched to an off state.

9. A method in accordance with claim 5 wherein the heating device is in contact with the at least one ohmic contact.

10. A method in accordance with claim 1 further comprising using a temperature sensor to control the temperature level of the heat, the temperature sensor configured to sense the temperature of the image detecting device.

11. A method in accordance with claim 1 further comprising fabricating at least a portion of the image detecting device using a cadmium zinc telluride (CZT) material.

12. A method in accordance with claim 1 further comprising coupling a resistance dependent heating device to the at least one ohmic contact and controlling current through the resistance dependent heating device to control the temperature level.

13. An imaging system in accordance with claim 1 wherein applying heat to the image detecting device comprises using heat generated by electronics of the image detecting device to heat the image detecting device.

14. An image detecting device comprising:
a substrate;
at least one ohmic contact coupled to the substrate; and
a heat source configured to increase a temperature of the substrate, wherein said heat source comprises a heating element coupled to said at least one ohmic contact such that said heating element is in thermal contact with said at least one ohmic contact, said heating element configured to increase an operating temperature of the image detecting device.

15. An image detecting device in accordance with claim 14 wherein the substrate comprises cadmium zinc telluride (CZT).

16. An image detecting device in accordance with claim 14 wherein the heat source comprises a heating device configured to vary a temperature level based on an applied current level.

17. An image detecting device in accordance with claim 14 wherein the heat source comprises a thermo-foil to increase the temperature of the substrate.

18. An image detecting device in accordance with claim 14 wherein the heat source is configured to maintain an increased temperature level of the substrate during a non-scanning mode.

19. An image detecting device in accordance with claim 14 wherein the heat source is thermally coupled to the substrate to one of (i) directly heat and (ii) indirectly heat the substrate and further comprising a temperature sensor configured to measure the temperature of the substrate.

20. An imaging system comprising:
a radiation source configured to emit a flux of photons;
an image detecting device configured to receive the flux of photons and generate a response based on the flux of photons, the image detecting device fabricated at least in part using at least one of a cadmium zinc telluride (CZT) material and cadmium telluride (CdTe) material with at least one ohmic contact coupled to the image detecting device; and
a heat source configured to increase a temperature of the image detecting device, wherein said heat source comprises a heating element coupled to said at least one ohmic contact such that said heating element is in thermal contact with said at least one ohmic contact, said heating element configured to increase an operating temperature of the image detecting device.

21. An imaging system in accordance with claim 20 further comprising a temperature sensor configured to measure the temperature of the image detecting device.

22. An imaging system is accordance with claim 20 wherein the heat source has one of a thickness and absorption level such that x-rays impinging on the image detecting device are not absorbed by the heat source.

* * * * *